United States Patent [19]

Cook

[11] 4,005,287
[45] Jan. 25, 1977

[54] NOSE ATTACHMENT FOR OCR WAND

[75] Inventor: Paul A. Cook, Dallas, Tex.

[73] Assignee: Recognition Equipment Incorporated, Dallas, Tex.

[22] Filed: July 28, 1975

[21] Appl. No.: 599,474

[52] U.S. Cl. ............................... 250/239; 250/568
[51] Int. Cl.² .......................................... H01J 5/02
[58] Field of Search .......... 250/237, 239, 566, 567, 250/568, 569, 555; 235/61.11 E; 340/146.3 SY

[56] References Cited

UNITED STATES PATENTS

| | | | |
|---|---|---|---|
| 3,334,236 | 8/1967 | Bacon | 235/61.11 E |
| 3,528,295 | 9/1970 | Johnson et al. | 340/146.3 SY |
| 3,727,030 | 4/1973 | McMurtry | 235/61.11 E |
| 3,748,483 | 7/1973 | Englund et al. | 250/568 |
| 3,792,240 | 2/1974 | Stumdo | 340/146.3 SY |
| 3,920,959 | 11/1975 | Wefers et al. | 250/555 |

*Primary Examiner*—David C. Nelms
*Attorney, Agent, or Firm*—John E. Vandigriff

[57] ABSTRACT

Apparatus for attaching a nose section to the main body of a hand-held optical reader (Wand) is provided to accommodate the replacement of internal lamps illuminating a field of information. A nose attachment having a centrally located aperture encompassed by an integral and externally threaded cylindrical extension is secured to the nose section. The aperture and cylindrical extension are aligned and concentric with the optical image path of the Wand. In attaching the nose section to the Wand main body, the cylindrical extension is passed through an aperture in a partitioning frame of the Wand into which the lamps are seated. A screw-on cap, having a centrally located aperture with internal helical threads complementing the external threads of the nose attachment extension, is screwed onto the extension to secure the nose section to the partitioning frame. An outwardly extending flange integrally formed on the cap extends through opposing apertures of the Wand outer covers to accommodate access by hand. When the lamps are to be removed, a tangential force couple is applied by hand to the flange of the cap to detach the nose section, and thereby expose the lamps. Captive surfaces formed onto the nose attachment and the partitioning frame prevent lateral movement between the nose section and the Wand, and confine the movement of the screw-on cap within the Wand when the nose section is detached.

7 Claims, 4 Drawing Figures

NOSE ATTACHMENT FOR OCR WAND

FIELD OF THE INVENTION

This invention relates generally to an apparatus for attaching a nose section to an optical reader. In a specific aspect, the invention relates to an attachment apparatus for accommodating the replacement of internal lamps by hand without impairing the optical operation of the reader.

DESCRIPTION OF THE PRIOR ART

Apparatuses developed for attaching a nose section to the main body of an optical reader include the following: a rubber O-ring assembly; a nose piece having a serrated edge which is locked into place by interlocking grooves formed in an internal wall of the optical reader; a nose piece having an external interlocking key working in combination with an internal fitting grip seated within a groove in a wall of the reader; a nose piece having a captive U-shaped spring to connect the nose piece to an inner flange formed in the wall of the reader; and a nose piece having a transverse finger extending from one internal wall face, through an aperture of an L-shaped bracket fitted to the main body of the optical reader, and secured within a groove of an opposite internal wall by a spring clip.

The rubber O-ring assembly is susceptible to shrinkage after a relatively short period of use. The serrated edge-interlocking groove combination and the interlocking key concept require close manufacturing tolerances to prevent relative movement between Wand parts. Similarly, the requirement of close manufacturing tolerances has prevented the use of the U-shaped spring and L-shaped bracket assemblies as the manufacturing costs are high.

The invention disclosed herein may be comprised of a material less susceptible to shrinkage over long periods of use, and does not require close manufacturing tolerances to prevent the occurrence of loosely fitting interlocking parts.

SUMMARY OF THE INVENTION

An apparatus for attaching a nose section to a hand-held optical reader is provided which accommodates the replacement of internally seated lamps illuminating a field of information. More particularly, a nose attachment secured to a nose section is comprised of an externally threaded and cylindrical extension encompassing a centrally located aperture. The aperture and cylindrical extension are concentric with the optical image path of the reader. To attach the nose section to the main body of the reader, the cylindrical extension is passed through an aperture in a partitioning frame enclosed between outer covers of the reader. A screw-on cap, having an internally threaded cylindrical extension encompassing a centrally located aperture formed into the cap, is screwed onto the cylindrical extension of the nose attachment to secure the nose section to the partitioning frame of the reader.

In one aspect of the invention, outer lateral surfaces of a flange encircling one end of the screw-on cap extend through the outer covers of the optical reader to accommodate detachment of the nose section by hand.

In another aspect of the invention, the simplistic construction of the component parts obviates the necessity of close manufacturing tolerances.

In still another aspect of the invention, captive surfaces are formed onto the nose attachment and the partitioning frame to prevent lateral movement therebetween, and to confine the screw-on cap when the nose section is detached.

In a further aspect of the invention, an injection molded plastic is used to form the component parts and thereby substantially eliminate shrinkage over long periods of use.

DESCRIPTION OF THE DRAWINGS

For a more complete understanding of the present invention and for further objects and advantages thereof, reference is now made to the following description taken in conjunction with the accompanying drawings, in which.

DESCRIPTION OF THE PREFERRED EMBODIMENTS

Figure 1:
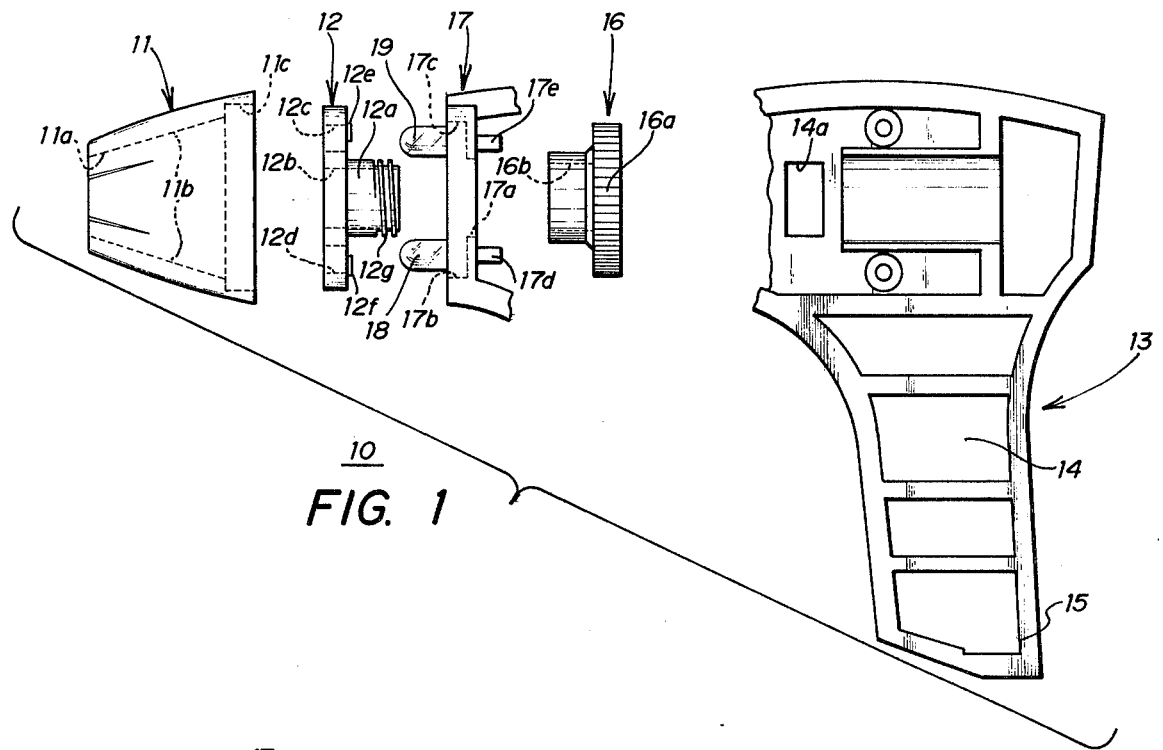
FIG. 1 is an exploded view of a hand-held optical reader with an outer cover removed.

FIG. 1 illustrates an exploded view of a hand-held optical reader 10 (Wand) with an outer cover of the reader removed to expose internal parts thereof.

Reader 10 includes a nose section 11 having an opening 11a and a passage 11b diverging from the opening to a rectangular recess 11c parallel to opening 11a. Seated within recess 11c is a rectangular shaped nose attachment 12 having a cylindrical extension 12a projecting outward from nose section 11 and encompassing a centrally located aperture 12b. Aperture 12b is aligned with the optical image path of the reader 10 and concentric with opening 11a. Encircling the end of extension 12a are helical threads 12g for securing attachment 12 to a main body 13 of reader 10. On either side of extension 12a are apertures 12c and 12d partially encompassed by arcuate captive surfaces 12e and 12f, respectively, which extend parallel to extension 12a and project outward from nose section 11.

Main body 13 comprises a partitioning frame 15 and a screw-on cap 16 enclosed within outer covers 14. Cap 16 is cylindrical in shape with a transverse and outwardly extending circular flange 16a, at one end, and an aperture 16b formed along the longitudinal axis of the cap. At the end opposite flange 16a, inner helical threads complementing outer threads 12g are formed.

A vertical section 17 of frame 15 has formed therein a central aperture 17a of a size to accommodate the extension 12a. Formed on either side of aperture 17a are recesses 17b and 17c in which are seated lamps 18 and 19, respectively. Projecting normally from section 17 and opposite recesses 17b and 17c are captive surfaces 17d and 17e, respectively, which serve to define the area of movement of cap 16 when nose section 11 is detached.

In the preferred embodiment disclosed herein, cap 16 is aligned with a rectangular opening 14a of cover 14 so that a portion of the flange 16a protrudes through the opening for easy access by hand. Nose attachment 12 is seated within recess 11c and affixed to nose section 11 with a suitable glue. Nose section 11 in turn is attached to main body 13 by passing extension 12a through aperture 17a, and lamps 18 and 19 through apertures 12d and 12c, respectively. Concurrently, surfaces 12e and 12f are inserted into recesses 17c and 17b, respectively, and about internal surfaces thereof to prevent lateral movement between nose section 11 and main body 13. When cap 16 is screwed onto extension 12a, nose section 11 is firmly secured to main body 13.

When the lamps 18 and 19 are to be replaced, cap 16 may be unscrewed from extension 12a by applying a tangential force couple to that portion of flange 16a protruding through outer cover openings such as opening 14a. In this manner, the nose section 11 and nose attachment 12 may be removed from main body 13 without the use of tools, and lamps 18 and 19 may be exposed for replacement without removing outer covers 14. During this operation, cap 16 is held in proximity by captive surfaces 17d and 17e.

Figure 2:
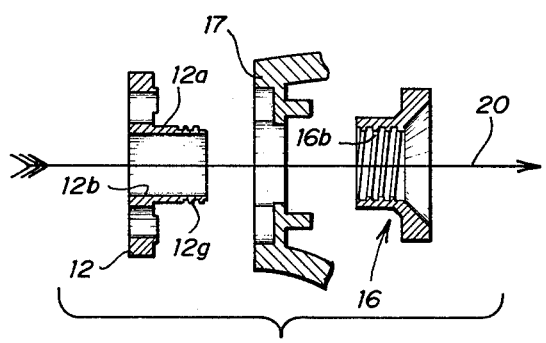
FIG. 2 is a partial sectional side view of coupling elements of FIG. 1.

Referring to FIG. 2, there is illustrated a cross-sectional and exploded side view of the coupling elements of FIG. 1. Nose attachment 12, section 17 of main body 13, and cap 16 are shown aligned with the optical image path represented by a directed line 20. As may be seen by inspection of FIG. 2, nose attachment 12 may be secured to frame section 17 by screwing cap 16 onto extension 12a without in any way impeding the optical path indicated by directed line 20 and apertures 12b and 16b.

In the preferred embodiment of the invention, nose attachment 12 and screw-on cap 16 are comprised of an injection molded plastic to prevent shrinkage over a long period of use. Further, the simplistic character of the embodiment obviates the need for close manufacturing tolerances.

Figure 3:
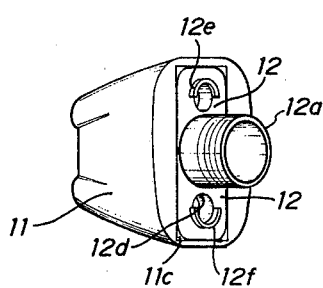
FIG. 3 is a perspective view of the nose section of FIG. 1.

The relationship between nose attachment 12 and nose section 11 may be more easily understood by referring to FIG. 3. Nose attachment 12 is shown seated within recess 11c of nose section 11, with cylindrical extension 12a projecting outward from the nose section. On either side of extension 12a are apertures 12c and 12d through which lamps 19 and 18 depend, respectively. Arcuate captive surfaces 12e and 12f partially encompass apertures 12c and 12d, respectively, and provide a means for preventing lateral movement between nose section 11 and main body 13.

Figure 4:
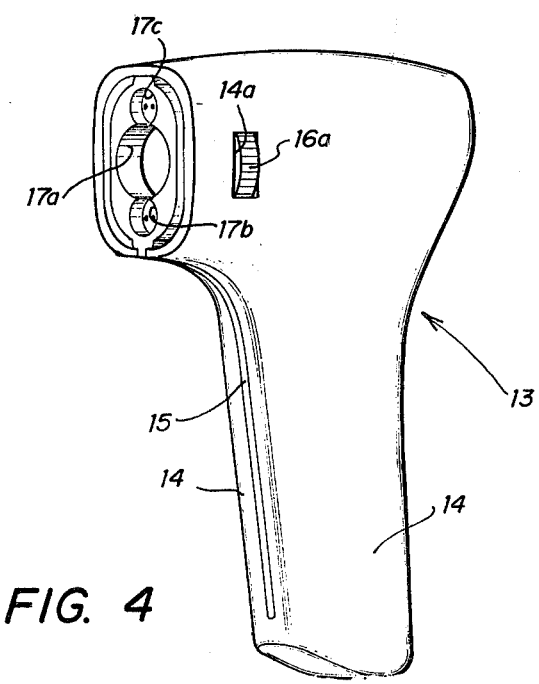
FIG. 4 is a perspective view of the Wand of FIG. 1 with the nose section removed.

FIG. 4 illustrates a perspective view of main body 13 to which nose section 11 is secured. As before described, lamps are seated within and extend outward from recesses 17b and 17c of partitioning frame 15. To remove nose section 11 from main body 13, a tangential force couple is applied by hand to the portion of flange 16a protruding through opening 14a. Nose section 11 and nose attachment 12 then may be removed to expose the internal lamps without the use of tools and without removing outer covers 14. When nose section 11 is to be reattached to main body 13, extension 12a of nose attachment 12 is inserted into aperture 17a and secured by cap 16. Cap 16 is screwed onto extension 12a by again applying a tangential force couple to flange 16a. It is understood that an opening corresponding to opening 14a is provided in an outer cover opposite to that shown.

In accordance with the invention, there is provided a nose section attachment apparatus for an optical reader which accommodates the removal of internal lamps without interferring with the optical path therethrough, and which obviates the use of tools and the removal of the outer covers of the reader. The simplistic construction of the invention further requires no close manufacturing tolerances, and is readily adaptive to the use of materials having little tendency to shrink.

Having described the invention in connection with certain specific embodiments thereof, it is to be understood that further modifications may now suggest themselves to those skilled in the art and it is intended to cover such modifications as fall within the scope of the appended claims.

What is claimed is:

1. A hand-held wand for an optical reader constructed to accommodate element replacement which comprises:
   a. a wand body having a light sensitive array mounted therein on an optical axis for receiving light reflected from an external data field, and further having illuminating means adjacent to but spaced from said optical axis and facing away from said body to illuminate said field;
   b. a nose section having an aperture symmetrical about said optical axis and encompassed by a threaded extension passing into said body from the end of said body facing said field; and
   c. a rotatable threaded cap engaging said extension within said body, said cap having a bore therethrough coaxial with said optical axis and said cap having an outer flange thereon extending in a direction transverse to the optical axis and extending through said wand body.

2. Attachment structure for a nose section of a hand-held wand for an optical reader system wherein the nose section has a scan aperture therein at an optical axis thereof, which comprises:
   a. a nose structure having a first bore coaxial with said optical axis and secured to said nose section at the end opposite said aperture, a second bore parallel to but spaced from said first bore, and a hollow externally threaded member coaxial with said first bore and extending away from said aperture;
   b. a wand body having an aperture through which said externally threaded member passes, and having a lamp receptacle facing said nose structure and spaced from said optical axis to register with said second bore;
   c. a rotatable cap having a central bore therethrough at least partially internally threaded to engage said externally threaded member, thereby to secure said nose section to said body while accommodating transmissions of light reflected from said field through said aperture and said cap; and
   d. an outer flange on said cap extending transverse to said optical axis and extending through said wand body.

3. An apparatus for attaching and detaching a nose section of a hand-held optical reader to accommodate the removal of a plurality of internal lamps illuminating a data field, which comprises:
   a. an attaching means secured to and for interfacing said nose section with said reader, said attaching means having a first aperture concentric with an optical image path of said reader and encompassed by an externally threaded extension integral to said attaching means;
   b. receiving means affixed to said reader for accepting said attaching means, and having a second aperture aligned with said first aperture and of a diameter to accommodate the passage of said externally threaded extension therethrough;

c. a rotatable cap having a third aperture, aligned with said second aperture, and encompassed by an extension of said cap having internal threads complementary to those of said externally threaded extension, said third aperture being of a diameter to receive said externally threaded extension therein;

d. an outer flange on said cap extending transverse to said optical image path; and e. a pair of outer covers enclosing said reader and having formed therein a pair of opposing apertures to accommodate the protrusion of said outer flange therethrough;

4. The apparatus set forth in claim 3 wherein said attaching means includes a plurality of apertures symmetrically located about said first aperture, each of said plurality of apertures being of a diameter to accommodate the passage of one of said plurality of lamps therethrough.

5. The apparatus as set forth in claim 4, said receiving means further having a plurality of lamp receptacles in alignment with said plurality of apertures, and said attaching means further having a plurality of arcuate captive surfaces partially encompassing said plurality of apertures and of a shape to abut inner surfaces of said plurality of receptacles to impede lateral movement between said attaching means and said receiving means.

6. The apparatus of claim 3, said receiving means further having a pair of captive surfaces positioned symmetrically about said second aperture for restraining the lateral movement of said cap.

7. A nose section attachment apparatus for a hand-held optical reader, which comprises:

a. a nose attachment secured to said nose section, said nose attachment including:
  i. a first aperture in alignment with the optical image path of said reader,
  ii. a plurality of apertures symmetrical about said first aperture to accommodate the passage of a plurality of lamps therethrough,
  iii. a plurality of arcuate captive surfaces partially encompassing said plurality of apertures, and
  iv. an externally threaded extension encompassing said first aperture;

b. a main body of said reader having a second aperture in alignment with said first aperture and of a diameter to accommodate the passage of said externally threaded extension therethrough, a plurality of lamp receptacles symmetrical about said second aperture, and a plurality of captive surfaces on a face of said member opposite said lamp receptacles; and c. a cylindrical screw-on cap having a third aperture in alignment with said second aperture and encircled by internal threads complementary to those of said externally threaded extension, and further having an outer flange encircling one end of said cap and protruding through outer surfaces of said reader.

* * * * *